United States Patent
Riley et al.

(10) Patent No.: US 8,700,322 B2
(45) Date of Patent: Apr. 15, 2014

(54) EFFICIENT USE OF EXPECTED USER ALTITUDE DATA TO AID IN DETERMINING A POSITION OF A MOBILE STATION

(75) Inventors: Wyatt Thomas Riley, Wayne, PA (US); Ardalan Heshmati, Saratoga, CA (US)

(73) Assignee: QUALCOMM Incorporated, San Diego, CA (US)

( * ) Notice: Subject to any disclaimer, the term of this patent is extended or adjusted under 35 U.S.C. 154(b) by 795 days.

(21) Appl. No.: 12/034,012

(22) Filed: Feb. 20, 2008

(65) Prior Publication Data

US 2009/0210156 A1 Aug. 20, 2009

(51) Int. Cl.
*G01S 19/00* (2010.01)
*G01S 19/22* (2010.01)

(52) U.S. Cl.
CPC .................................. *G01S 19/22* (2013.01)
USPC ........... 701/469; 701/468; 701/494; 701/495; 342/462

(58) Field of Classification Search
USPC ................. 701/213, 214, 469, 468, 494, 495; 342/357.36, 462
See application file for complete search history.

(56) References Cited

U.S. PATENT DOCUMENTS

| | | | |
|---|---|---|---|
| 5,415,031 A * | 5/1995 | Colleu et al. ................ | 73/178 R |
| 5,646,857 A * | 7/1997 | McBurney et al. ........... | 701/475 |
| 6,061,018 A | 5/2000 | Sheynblat | |
| 6,429,814 B1 | 8/2002 | van Diggelen | |
| 6,552,681 B1 | 4/2003 | Hayward et al. | |
| 6,590,530 B2 | 7/2003 | van Diggelen | |
| 6,756,938 B2 * | 6/2004 | Zhao et al. ................ | 342/357.33 |
| 6,985,903 B2 | 1/2006 | Biacs | |
| 7,676,232 B2 * | 3/2010 | Wigren et al. ............. | 455/456.1 |
| 2005/0027450 A1 | 2/2005 | Cox et al. | |
| 2005/0033504 A1 * | 2/2005 | Rennels ........................ | 701/117 |
| 2006/0074958 A1 | 4/2006 | Biacs | |
| 2006/0227044 A1 * | 10/2006 | Terashima et al. ........ | 342/357.02 |
| 2006/0271294 A1 | 11/2006 | Mizuochi | |
| 2007/0218823 A1 | 9/2007 | Wolf | |

FOREIGN PATENT DOCUMENTS

| | | |
|---|---|---|
| CN | 1351716 A | 5/2002 |
| CN | 1670542 A | 9/2005 |
| JP | 62261087 A | 11/1987 |
| JP | 4080679 A | 3/1992 |
| JP | 5026678 A | 2/1993 |

(Continued)

OTHER PUBLICATIONS

European Search Report—EP08006072—Search Authority—Munich—Aug. 18, 2009.

(Continued)

*Primary Examiner* — Adam Tissot
(74) *Attorney, Agent, or Firm* — Arnold Gum

(57) ABSTRACT

A method and apparatus for using a predetermined portion of terrain elevation maps in a database for aiding in computing a three-dimensional position of a wireless station. Instead of using the entire terrain model of the earth or an entire country, the database consists of an incomplete model, which includes only the most populous areas or specific regions. This reduces the size of the information in the database, which in turn reduces the amount of time to compute the positions of the wireless device.

26 Claims, 5 Drawing Sheets

(56) References Cited

FOREIGN PATENT DOCUMENTS

| | | |
|---|---|---|
| JP | 5099680 A | 4/1993 |
| JP | 2002532679 | 10/2002 |
| JP | 2004514144 A | 5/2004 |
| JP | 2006504067 | 2/2006 |
| JP | 2006177783 A | 7/2006 |
| JP | 2007501381 A | 1/2007 |
| JP | 2008151611 A | 7/2008 |

OTHER PUBLICATIONS

International Search Report and Written Opinion—PCT/US2009/034782, International Search Authority—European Patent Office—Sep. 18, 2009.
Partial European Search Report—EP08006072—Search Authority—Munich—Jun. 16, 2009.
Taiwan Search Report—TW098105521—TIPO—Feb. 27, 2013.

* cited by examiner

EFFICIENT USE OF EXPECTED USER ALTITUDE DATA TO AID IN DETERMINING A POSITION OF A MOBILE STATION

BACKGROUND OF THE INVENTION

1. Field of the Invention

The features of the present invention relate to position determination systems and more particularly to a method and apparatus for determining a position of a mobile device or mobile station using global positioning system (GPS) data and expected user altitude on data.

2. Background Art

To determine a position of a mobile device a Global Positioning System (GPS) uses measurements from several satellites to compute position in three (3) dimensions (i.e., latitude, longitude, and altitude). For the ideal situation, four (4) or more satellites are required for these measurements. However, in certain situations, there may not be enough satellites to accurately determine an altitude. For example, in some cases only three (3) GPS satellites are available. In these cases, a measurement is sometimes available in the form of an altitude estimate, and in this case four (4) measurements (3 GPS+1 altitude) can be used. This can include blocked GPS signal environments (e.g. indoors, urban canyon), or even moderate GPS environments, where at some point during startup, only three (3) GPS measurements are ready. Even in some cases when four (4) GPS satellites are available, the geometry of those satellites is poor, or the solution is otherwise not high enough quality to be usable, and the use of altitude aiding can provide an additional measurement to improve the accuracy and reliability of that solution. For this situation, many commercial GPS receivers offer a fixed altitude mode for situations where the altitude of the receiver is available from external means, such as knowledge that the receiver is being used on the surface of the ocean in a maritime GPS receiver. Also, mobile stations sometimes remember a previously calculated altitude, and use that for altitude aiding; however, obvious problems with this technique include the inability to determine an altitude for a first positioning attempt or when the mobile station has moved significantly since the previous altitude was calculated.

The fixed altitude technique, while useful in some situations, cannot address the general problem of determining position over uneven and/or unknown terrain. The use of terrain elevation maps is disclosed in U.S. Pat. No. 6,429,814 B1 and U.S. Pat. No. 6,590,530 B2. However, these devices are impractical and require substantial resources due to the volume of terrain elevation data for the entire earth. These worldwide altitude databases are often stored on a server and, due to their size, are rarely in a mobile station.

Therefore a need exists for a method and apparatus to accurately provide elevation data that is more practical and that requires less memory than the presently available systems.

SUMMARY OF THE INVENTION

Methods and apparatuses are disclosed herein that use defined terrain databases for altitude aiding for determining a position of a mobile station. The defined database contains expected user altitudes, based on terrain altitude data only for areas with dense user populations, and thus the database uses considerably less memory and is more efficient than systems that include the entire world or even a countrywide database. By using the disclosed aspects, GPS positioning occurs faster (faster time to fix) upon startup, and is more available (higher yield) within a given time frame. The disclosed aspects improve GPS yield and time to fix accuracy. In addition, they provide a predetermined expected user altitude database comprised of selected populated areas of the world or a selected country for use in altitude aiding in a mobile station and require less memory and is more efficient than a conventional terrain database, making it practical for use directly on a mobile device.

BRIEF DESCRIPTION OF THE DRAWINGS

The accompanying drawings, which are incorporated into and form a part of the specification, illustrate several aspects of the present invention and, together with the description, serve to explain the principles of the invention. The drawings are only for the purpose of illustrating a preferred aspect of the invention and are not to be construed as limiting the invention. In the drawings.

DESCRIPTION OF THE PREFERRED EMBODIMENTS

Figure 1:
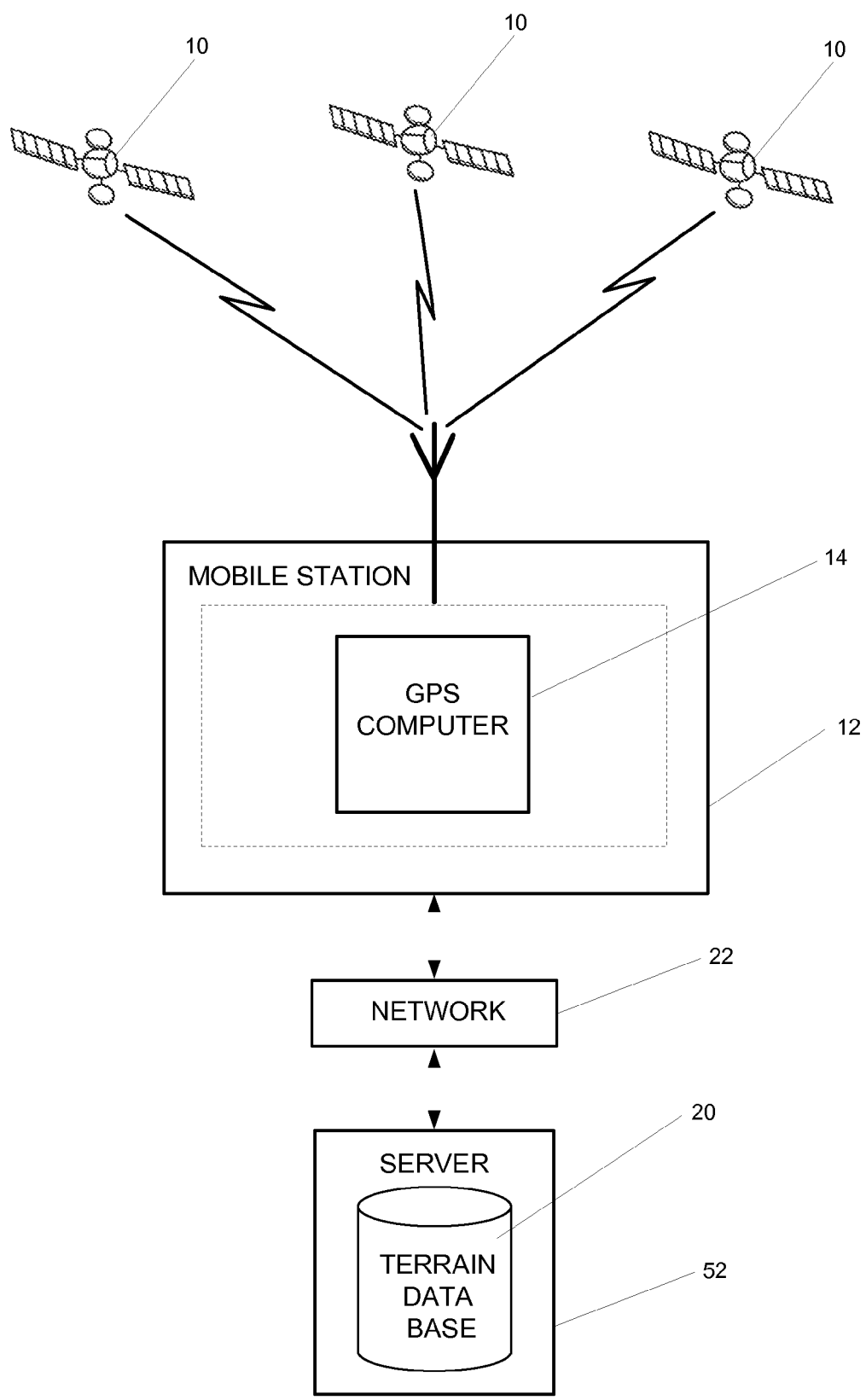
FIG. 1 is a depiction of a prior art altitude aiding system.

FIG. 1 shows a prior art system using the entire world terrain database for altitude aiding. In FIG. 1, satellites 10 send signal to a mobile station 12. A terrain database 20, inside a server or other external source 52, sends an altitude over communication network 22 to mobile station 12. The GPS signals and the localized altitude aiding are used by GPS computer 14 to determine the position of mobile station 12. In these prior art systems, terrain database 20 contains terrain maps of the entire earth, thus the need for an external server 52 or a very large memory source. The present system operates in a similar fashion; however the expected user altitude database is made up of selected portions of the worldwide terrain database, as modified for building heights.

Figure 2:
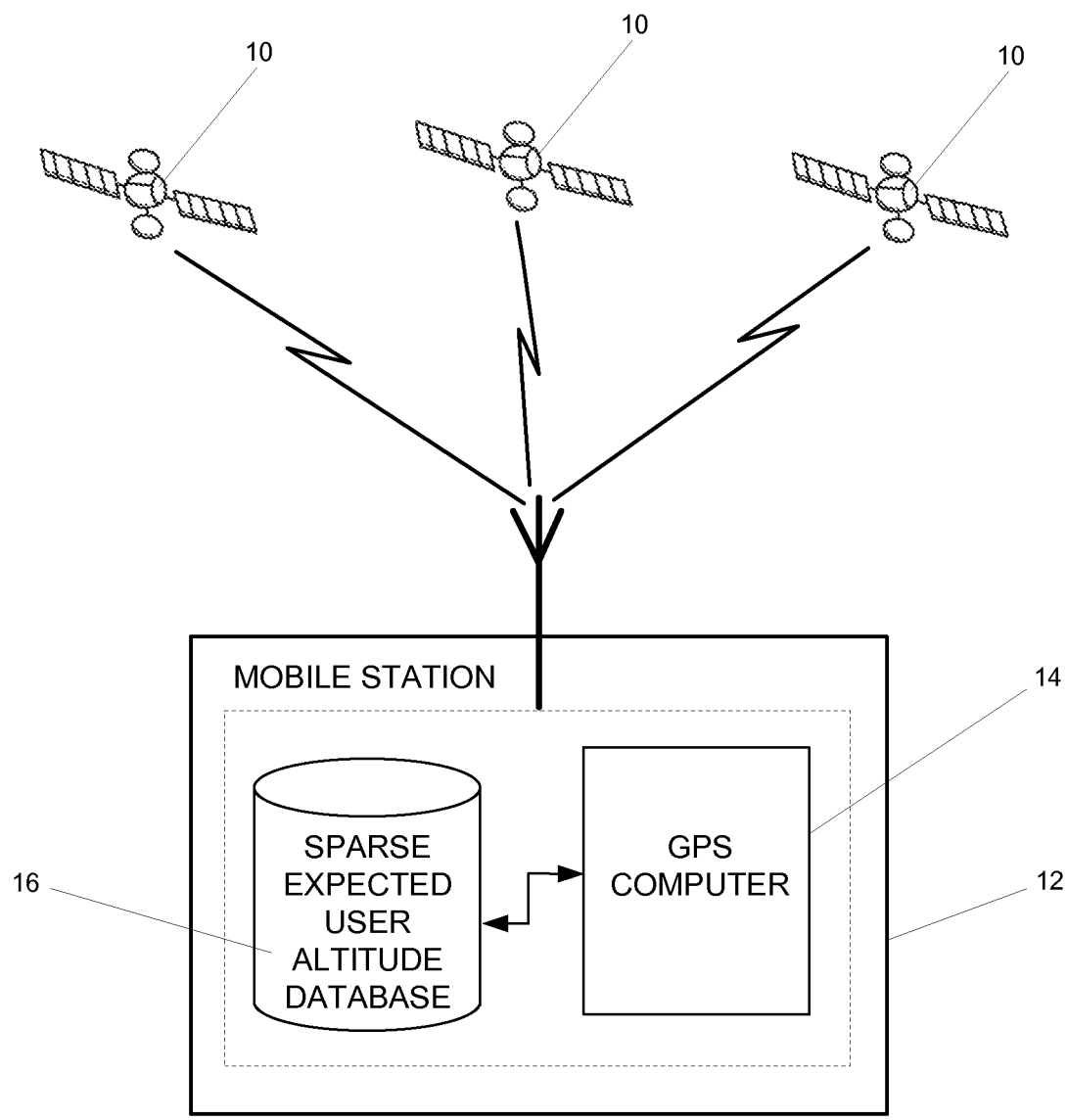
FIG. 2 shows the one embodiment of an altitude aiding system described herein.

FIG. 2 shows an example of the current invention, using a sparse expected user altitude database for altitude aiding. As shown in FIG. 2, satellites 10 send signal to mobile station 12. A sparse expected user altitude database 16 inside mobile station 21 sends localized altitude aiding to GPS computer 14 when available. GPS computer 14 combines the GPS signals and the altitude aiding to determine the position of mobile station 12. Due to the reduced memory required by sparse expected use database 16, memory internal to mobile station 12 can be used without an external memory source or a very large memory inside mobile station 12.

Figure 3:
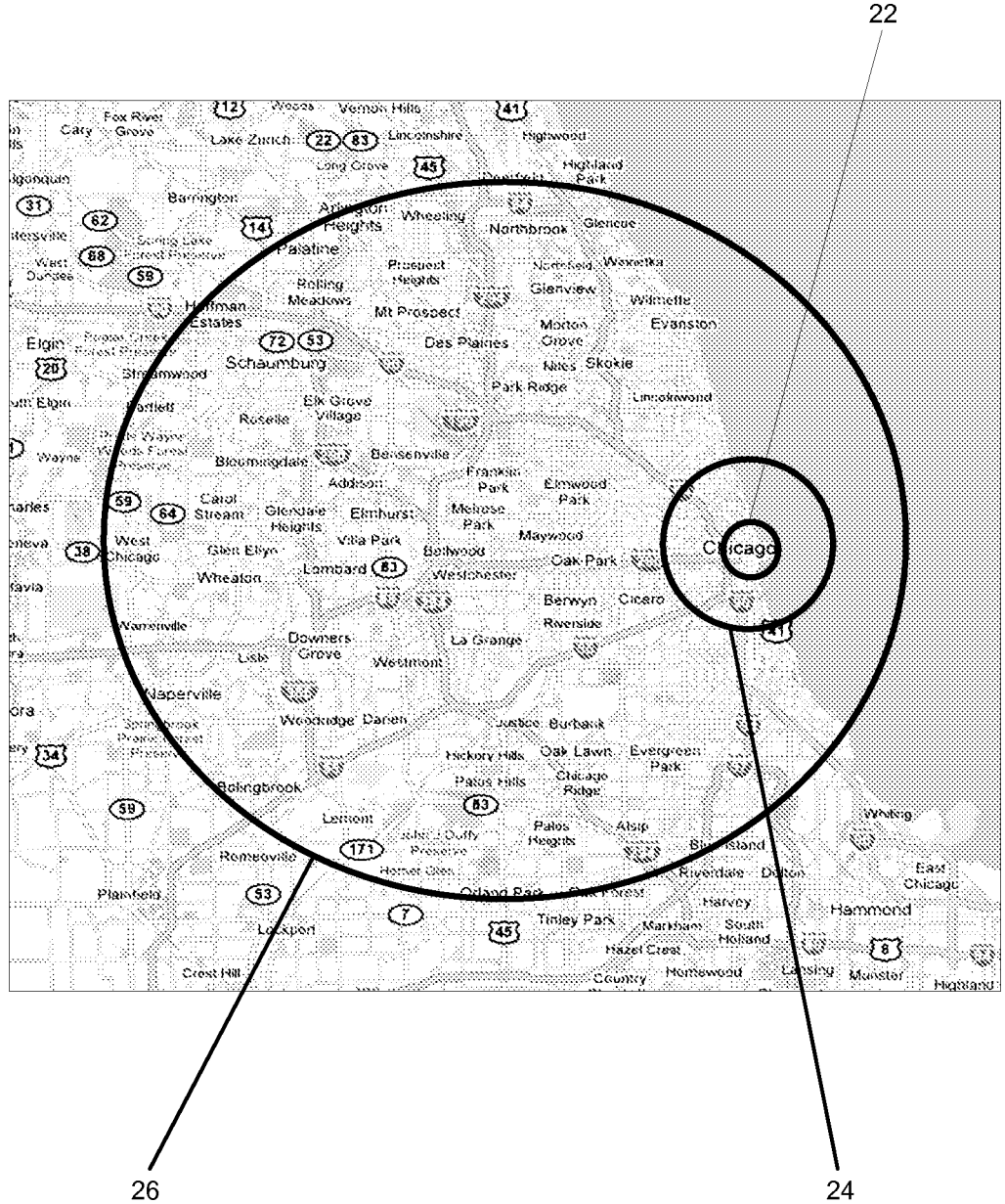
FIG. 3 is a map showing selected regions with different expected user altitudes for the expected user altitude database.

In order to further explain the aspects of the present invention, an industrial example is provided. FIG. 3 shows a map of the greater Chicago area. Within this map set of areas, defined in this figure as circles, is contained in sparse expected user altitude database 16. Although this example uses circles for coverage regions, the coverage area may be varied in any number of coverage shapes. In this example, three areas are selected, one with a radius of one and one half (1.5) kilometers 22, a second with a radius of four (4) kilometers 24, and a third with a radius of twenty-five (25) kilometers 26. Inside the first circle 22, in this example, the mobile station can be expected to be at an elevation of four hundred plus or minus 220 meters (400±220 m), inside the second circle 24 at an elevation of two hundred and eighty plus or minus eighty meters (280±80 m), and inside the third circle 26 with an elevation of two hundred and forty plus or minus forty meters (240±40 m). These values are tailored to the deviations in expected user altitude (ground elevations adjusted for the range of building heights) of the particular geographic area. Table 1 shows the latitude and longitude of circle center, radius, altitude and altitude uncertainty for the above example in the greater Chicago area.

TABLE 1

| Latitude | Longitude | Radius (km) | Altitude (m) | Alt. Uncertainty (m .99%) |
|---|---|---|---|---|
| 41.8833 | −87.6285 | 1.5 | 400 | 225 |
| 41.8732 | −87.6308 | 4 | 275 | 100 |
| 41.8531 | −87.6994 | 25 | 225 | 50 |

Figure 4:
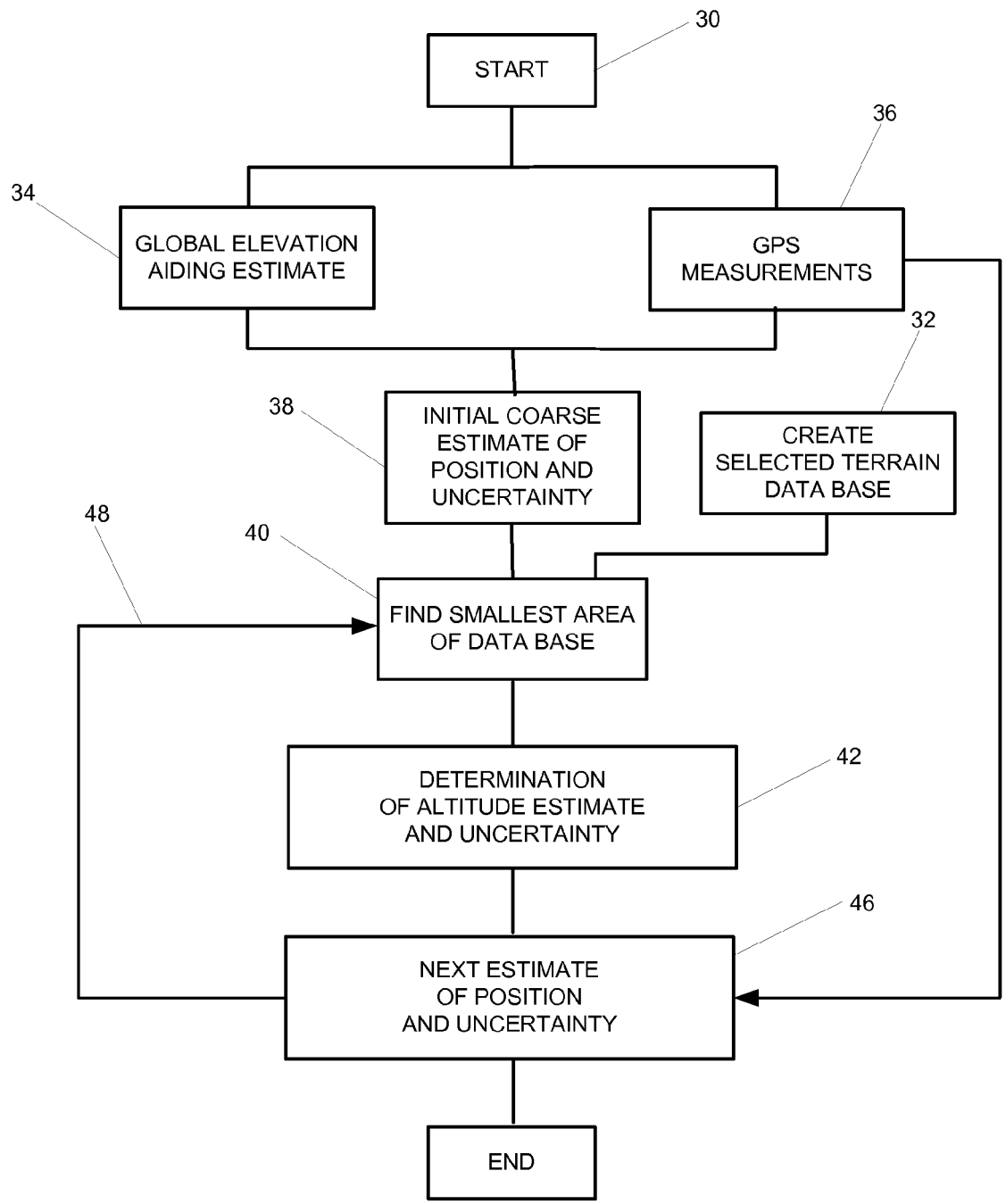
FIG. 4 is a flow chart showing an embodiment of a position location process described herein.

One method or process relating to determining position is shown in FIG. 4, a flowchart showing a preferred process. A first step is to initiate or start the system 30. The system then creates an expected user altitude or selected terrain database 32 that consists of, as an example, a few large circles, as shown in FIG. 3, (or other areas) that cover a small, but highly-used, portion of the expected usage area for a particular device. For example a GPS receiver, phone or other mobile station sold in the USA may have an expected user altitude database that covers the 100 largest metro areas in the USA, with 5-20 circles each, each of which has a center Lat/Lon, a radius (of roughly 1-100 km), an average expected user height (terrain+buildings), and an uncertainty (standard deviation) of the expected user height. Although this example calls for circles, any variation of a limited area mapping that provides altitude as a function of latitude and longitude can be used.

When mobile station positioning is initially being attempted, the method starts with a globally valid elevation aiding estimate 34, in this example of 100 m±3000 m above sea level. The mobile station position is then estimated 38, using this altitude aiding measurement 34, plus the GPS measurements 36, by methods well known in the art. Based on estimated mobile station position 38, the method then finds the smallest radius database entry 40 from the selected expected user altitude database 32 that covers that coarse position and uncertainty. At that point, the altitude estimate and uncertainty for that database entry are determined 42, and are generally far more accurate than the globally valid altitude estimate above. The method then repeats the calculation of position and uncertainty for a second time 46, using the first determined altitude and altitude uncertainty 42, plus GPS measurements 36, to determine a second, improved estimate of mobile station position 46. The system then ends 50.

At this point the position is often of sufficient accuracy to be used by an end-user of the positioning system, and to aid other internal functions of GPS signal processing, such as GPS measurement search window centering for satellites which are known to be above the horizon, but for which signal have not yet been acquired (a concept well known in the art).

This process can also continue, if desired, with the second mobile station position being used to look up an entry in the altitude database again, and if the database determined elevation estimate changes, then the position is recalculated 48. This iteration can continue until the altitude estimate and uncertainty determined from the database isn't changed between iterations, or until a predetermined maximum number of iterations have been reached (e.g., 5 iterations.)

Note that when only three (3) GPS measurements are used in combination with the initial, globally-valid coarse elevation aiding estimate 34, to determine a first position estimate, it is recognized that the resultant position estimate may have a large horizontal uncertainty, often a kilometer or more, which is often not sufficiently accurate for an end user application. Fortunately, this position is generally sufficiently accurate to be used to lookup an improved altitude in step 40 of the sparse altitude database. When this position is in a populated area, even this large uncertainty area is generally still within one of the elevation database entries, and the altitude estimate uncertainty improvement can still proceed as above.

In cases where the estimated mobile station position is not within any area covered by an entry in the database, the available altitude aiding cannot be improved beyond the globally valid, coarse elevation aiding 34 as described above. In this case, the value of the aspects of this invention in improving accuracy, yield and time to fix benefits is limited to the use of globally valid altitude aiding. While this database lookup failure is expected to be the case in a very large percentage of the land-area, it is not expected to be the case in a very large percentage of the end user cases, because the sparse database 32 is specifically targeted to cover just the relatively small areas where mobile station users are most likely to be located (e.g. urban and suburban areas.)

This database is created and tailored for use in different parts of the world. For instance, in the mid-western United States, which often is relatively flat, the radius of the circles or coverage region for inclusion in the database can be relatively large. However in mountainous regions or cities, such as San Francisco, Calif., the method may require smaller circles or regions to provide similarly accurate altitude aiding. Additionally, areas with tall buildings may require smaller regions to accommodate the large variations in expected mobile user elevation (as users can be at widely varying heights in the buildings.)

In areas that are relatively flat, even relatively unpopulated areas can be efficiently covered by the sparse elevation database in this invention. For example, most of the rural and small-community areas of southern Florida can be covered by one database entry with an altitude accuracy of better than 50 meters, providing altitude aiding to a population of several hundred thousand people spread across a large area with a single database entry.

The accuracy and coverage of the sparse expected user altitude database can be tailored to the needs of a particular device (e.g. within a certain memory limit) or expected usage area (e.g. within a certain distance of the expected purchase location of the mobile unit). For example, with accuracy goals of 100 meters of altitude accuracy, and a coverage goal of a single urban area, a database with very few entries, or even a single entry, may suffice. For accuracy goals of 50 meters or less, and coverage of, say, 95% of the population of an entire country (or the entire world), several thousand database entries may be required. In either case, this is substantially less than the millions of database entries usually employed in a global terrain elevation database.

In addition, any general purpose compression schemes, such as zip, and .jpg, can be used for general compression of expected user altitude data. For example, encoding a grid of expected user altitude data (heights and uncertainties) by representing altitude, and/or altitude uncertainty as a grid of different intensity pixels in a black and white JPEG image, and using JPEG compression/decompression for efficient storage of the data can enhance the aspects of the present invention. This would be particularly efficient on a mobile station, because most mobile stations available on the market already come with high-speed JPEG compression/decompression hardware & software for other purposes (e.g. camera usage.)

Other methods of compression elevation data that can be used are Lat/Lon/Radius circular coverage areas, and or Lat/Long corners of rectangles, Voronio diagrams, local-area-grids with interpolation, which have an associated elevation, and uncertainty around that elevation.

The elevation and/or terrain elevation to be encoded is the "terrestrial mobile station's elevation" which can often be assumed to be equal the terrain elevation ground level or it can be a certain distance from the ground level. For example, typically it is probably 1-1.5 meters higher than ground level when a human is using the device outdoors or in a vehicle. In areas with tall buildings, both the average "terrestrial mobile station elevation", and the uncertainty around that should be increased, to allow for the fact that many mobile stations may be several stories above ground level in the buildings.

Figure 5:
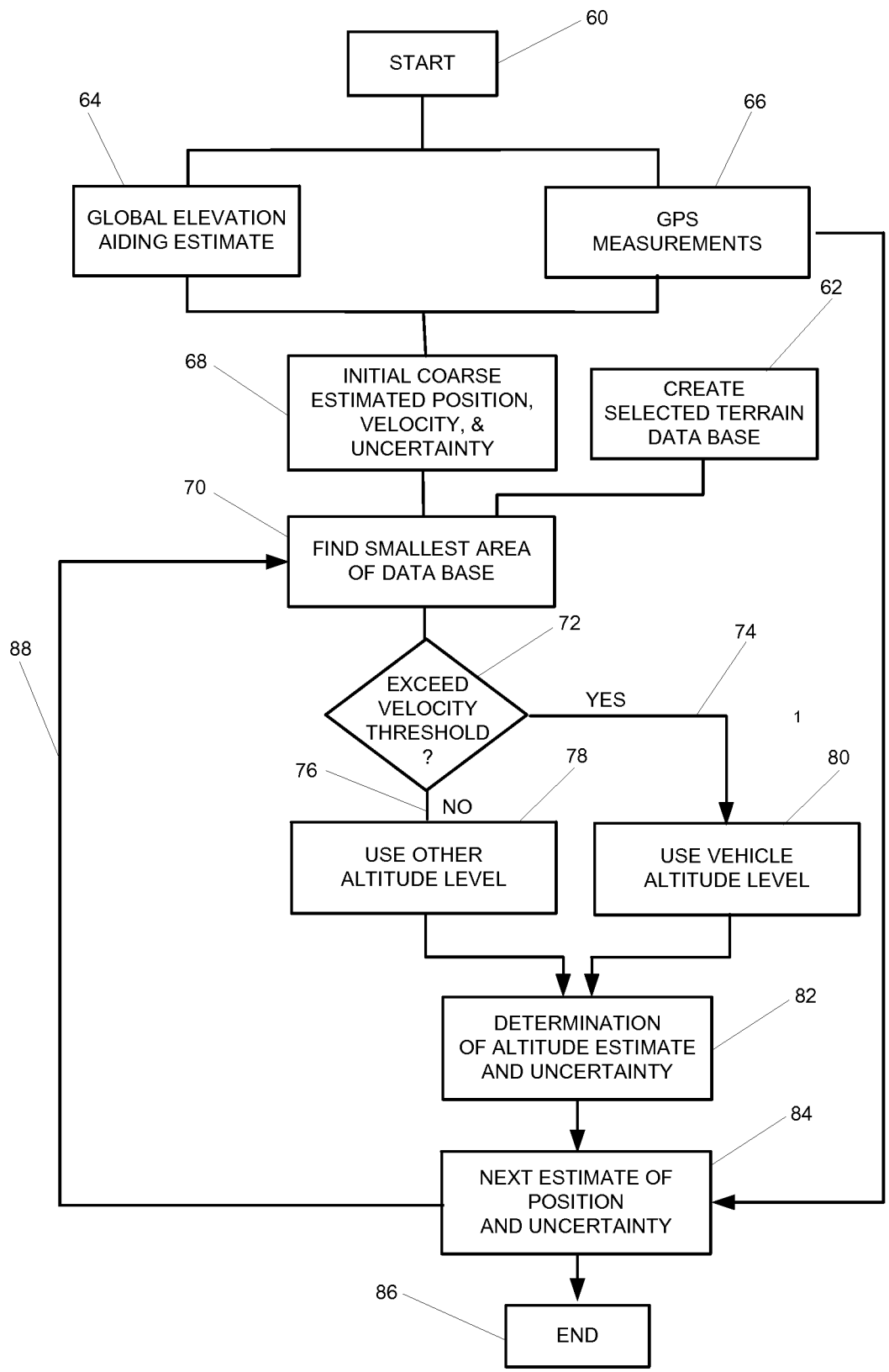
FIG. 5 is a flow chart showing an embodiment of the process using velocity and two different assumed altitude levels to assist in determining position of the mobile station.

FIG. 5 shows another embodiment of a process using velocity and two different assumed altitude levels for the mobile station. The process is generally similar to the process in FIG. 4 with several variations. In areas with tall buildings, the expected user elevation database may include two entries in a given area, one for 'vehicle-level' 80 typically near ground level, and one for all other users 78 covering up to the tops of tall buildings. The vehicle level entry 80 would be near ground level, and would have a smaller uncertainty than that required to cover the tall buildings, thus being more valuable in the GPS position calculation. Again, the first step is to initiate or start the system 60. The system then creates an expected user altitude or selected terrain database 62 that consists of, as an example, a few large circles, as shown in FIG. 3, (or other areas) that cover a small, but highly-used, portion of the expected usage area for a particular device. When mobile station positioning is initially being attempted, the method starts with a globally valid elevation aiding estimate 64. The mobile station position is then coarsely estimated 68, using this altitude aiding measurement 64, plus the GPS measurements 66, by methods well known in the art. Based on estimated mobile station position 68, the method then finds the smallest radius database entry 70 from the selected expected user altitude database 62 that covers that coarse position and uncertainty. The process then determines which entry level to use. To determine which entry to use, the algorithm would first estimate the coarse user position, and, with the use of altitude-hold, a coarse user velocity. If the user velocity is over a threshold 72 that makes it likely to be a vehicle (e.g. over 5 m/s), then the algorithm would choose to use the 'vehicle-level' entry 80 from the expected user altitude database. If the user velocity is not over the threshold, it would use the 'other' entry 78 from the expected user altitude database that covers altitudes from ground level to the tops of tall buildings. At that point, the database determined altitude estimate and uncertainty for that location are determined for the first time 82, and are generally far more accurate than the globally valid altitude estimate 64. The method then repeats the calculation of position and uncertainty for a second time 84, using the first determined altitude and altitude uncertainty 82, plus GPS measurements 66, to determine a second, improved estimate of mobile station position 84. The system then ends 86.

This process can also continue, if desired, with the second mobile station position 84 being used to lookup an entry in the altitude database again, and if the database determined elevation estimate changes, then the position is recalculated 88. This iteration can continue until the altitude estimate and uncertainty determined from the database isn't changed between iterations, or until a predetermined maximum number of iterations have been reached (e.g. 5 iterations.)

The coarse user velocity can be calculated in the step 68 using an estimate of vertical velocity of 0 m/s—which can be considered globally valid elevation aiding 64 for velocity.

As used herein, a mobile station (MS) refers to a device such as a cellular or other wireless communication device, personal communication system (PCS) device, personal navigation device, laptop or other suitable mobile device capable of receiving and processing SPS signals. The term "mobile station" is also intended to include devices which communicate with a personal navigation device (PND), such as by short-range wireless, infrared, wireline connection, or other connection—regardless of whether satellite signal reception, assistance data reception, and/or position-related processing occurs at the device or at the PND. Also, "mobile station" is intended to include all devices, including wireless communication devices, computers, laptops, etc. which are capable of communication with a server, such as via the Internet, WiFi, or other network, and regardless of whether satellite signal reception, assistance data reception, and/or position-related processing occurs at the device, at a server, or at another device associated with the network. Any operable combination of the above are also considered a "mobile station."

Position determination techniques described herein may be used for various wireless communication networks such as a wireless wide area network (WWAN), a wireless local area network (WLAN), a wireless personal area network (WPAN), and so on. The term "network" and "system" are often used interchangeably. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, and so on. A CDMA network may implement one or more radio access technologies (RATs) such as CDMA2000, Wideband-CDMA (W-CDMA), and so on. CDMA 2000 includes IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). CDMA2000 is described in documents from a consortium named "3rd Generation Partnership Project 2" (3GPP2). 3GPP and 3GPP2 documents are publicly available. A WLAN may be an IEEE 802.11x network, and a WPAN may be a Bluetooth network, an IEEE 802.15x, or some other type of network. The techniques may also be used for any combination of WWAN, WLAN and/or WPAN.

Although the above description only recites GPS, the method and apparatus described herein may be used with various satellite positioning systems (SPS), such as the United States Global Positioning System (GPS), the Russian Glonass system, the European Galileo system, any system that uses satellites from a combination of satellite systems, or any satellite system developed in the future. Furthermore, the disclosed method and apparatus may be used with positioning determination systems that utilize pseudolites or a combination of satellites and pseudolites. Pseudolites are ground-based transmitters that broadcast a PN code or other ranging code (similar to a GPS or CDMA cellular signal) modulated on an L-band (or other frequency) carrier signal, which may be synchronized with GPS time. Each such transmitter may be assigned a unique PN code so as to permit identification by a remote receiver. Pseudolites are useful in situations where GPS signals from an orbiting satellite might be unavailable, such as in tunnels, mines, buildings, urban canyons or other enclosed areas. Another implementation of pseudolites is known as radio-beacons. The term "satellite", as used herein, is intended to include pseudolites, equivalents of pseudolites, and possibly others. The term "SPS signals", as used herein, is intended to include SPS-like signals from pseudolites or equivalents of pseudolites.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

What is claimed is:

1. A method for computing a position of a mobile station, the method comprising:
   storing at least one predetermined portion of an expected user altitude database in the mobile station;
   accessing a global elevation estimate;
   estimating an initial position of the mobile station based on the global elevation estimate and at least three global positioning system satellite measurements;
   identifying a first selected area in the stored at least one predetermined portion of the expected user altitude database based on the estimated initial position, the first selected area based on and including the estimated initial position;
   determining an altitude estimate from the initial position of the mobile station, and the at least one predetermined portion of the expected user altitude database, wherein the expected user altitude database includes at least two assumed altitude levels for the mobile station associated with at least a subset of coverage areas included in the expected user altitude database, and wherein determining the altitude estimate for the subset of coverage areas includes selecting an assumed altitude level from the at least two assumed altitude levels based at least in part on the velocity of the mobile station; and
   calculating the position of the mobile station.

2. The method of claim 1 further comprising calculating a mobile position uncertainty.

3. The method of claim 1 further comprising:
   determining a second altitude estimate based on at least one predetermined portion of the expected user altitude database based on the calculated position; and
   re-calculating the position of the mobile station.

4. The method of claim 3 comprising a maximum number of recalculation iterations.

5. The method of claim 1 wherein the identifying a first selected area comprises identifying a smallest selected area in the at least one stored predetermined portion of the expected user altitude database.

6. The method of claim 1 wherein the predetermined portion of the expected user altitude database comprises a center, a radius, an average expected user height and an uncertainty of the expected user height.

7. The method of claim 1 wherein the storing at least one predetermined portion of the expected user altitude database comprises compressing the predetermined portion of the expected user altitude database.

8. The method of claim 1 wherein the predetermined portion of the expected user altitude database comprises identifying at least one most populated portion of a selected area.

9. The method of claim 1 further comprising determining an altitude uncertainty from the expected user altitude database.

10. A system for computing a position of a mobile station, the system comprising:
    means for storing at least one predetermined portion of an expected user altitude database in the mobile station;
    means for accessing a global elevation estimate;
    means for estimating an initial position of the mobile station based on the global elevation estimate and at least three global positioning system satellites;
    means for identifying a first selected area in the stored at least one predetermined portion of the expected user altitude database based on the estimated initial position, the first selected area based on and including the estimated initial position;
    means for determining an altitude estimate from the initial position of the mobile station, and the at least one predetermined portion of the expected user altitude database, wherein the expected user altitude database includes at least two assumed altitude levels for the mobile station associated with at least a subset of coverage areas included in the expected user altitude database, and wherein determining the altitude estimate for the subset of coverage areas includes selecting an assumed altitude level from the at least two assumed altitude levels based at least in part on the velocity of the mobile station; and
    means for calculating the position of the mobile station.

11. The system of claim 10 further comprising a means for calculating a mobile position uncertainty.

12. The system of claim 10 further comprising:
    means for identifying a second selected area in the stored at least one predetermined portion of the expected user altitude database based on the calculated position; and
    means for re-calculating the position of the mobile station.

13. The system of claim 10 wherein the means for identifying a first selected area comprises a means for identifying a smallest selected area in the at least one stored predetermined portion of the expected user altitude database.

14. The system of claim 10 wherein the predetermined portion of the expected user altitude database comprises a center, a radius, an average expected user height and an uncertainty of the expected user height.

15. The system of claim 10 wherein the means for storing comprises a means for compressing the predetermined portion of the expected user altitude database.

16. The system of claim 10 wherein the predetermined portion of the expected user altitude database comprises a means for identifying at least one most populated portion of a selected area.

17. A computer program product, comprising:
a non-transitory computer readable medium comprising:
code for causing a location of a mobile station to be computed, the computer code comprising:
code for causing at least one predetermined portion of an expected user altitude database to be stored in the mobile station;
code for causing a global elevation to be estimated;
code for causing an initial position of the mobile station to be made based on the global elevation estimate and at least three global positioning system satellites;
code for causing a first selected area in the stored at least one predetermined portion to be selected based on the estimated initial position, the first selected area based on and including the estimated initial position;
code for determining an altitude estimate from the initial position of the mobile station, and at least one predetermined portion of an expected user altitude database, wherein the expected user altitude database includes at least two assumed altitude levels for the mobile station associated with at least a subset of coverage areas included in the expected user altitude database, and wherein determining the altitude estimate for the subset of coverage areas includes selecting an assumed altitude level from the at least two assumed altitude levels based at least in part on the velocity of the mobile station; and
code for causing the position of the mobile station to be calculated.

18. The computer program products of claim 17 further comprising code for causing a calculation of a mobile position uncertainty.

19. The computer program product of claim 17 further comprising:
code for causing a second selected area to be identified in the stored at least one predetermined portion of the expected user altitude database based on the calculated position; and
code for causing a re-calculation of the position of the mobile station.

20. A mobile station comprising:
a GPS computer to:
compute a position of the mobile station;
access a global elevation estimate;
estimate an initial position of the mobile station based on the global elevation estimate and at least three global positioning system satellite measurements;
identify a first selected area in the stored at least one predetermined portion of the expected user altitude database based on the estimated initial position, the first selected area based on and including the estimated initial position;
determine an altitude estimate from the initial position of the mobile station, and at least one predetermined portion of an expected user altitude database, wherein the expected user altitude database includes at least two assumed altitude levels for the mobile station associated with at least a subset of coverage areas included in the expected user altitude database, and wherein determining the altitude estimate for the subset of coverage areas includes selecting an assumed altitude level from the at least two assumed altitude levels based at least in part on the velocity of the mobile station; and
calculate the position of the mobile station; and
a memory to store the at least one predetermined portion of the expected user altitude database in the mobile station.

21. The method of claim 1 wherein the user altitude database comprises at least a portion of a worldwide terrain database in which the altitudes account for a range of building heights in a particular geographic area.

22. The method of claim 1 wherein the global elevation estimate comprises an estimated elevation above sea level.

23. The method of claim 1 wherein determining the altitude estimate from the initial position of the mobile station, the at least one predetermined portion of the expected user altitude database, and the velocity of the mobile station further comprises:
determining whether the velocity of the mobile station exceeds a predetermined threshold, and
selecting an altitude associated with a vehicle if the velocity of the mobile station exceeds the predetermined threshold.

24. The method of claim 1 wherein the global elevation estimate comprises an estimated elevation and an uncertainty factor, the uncertainty factor defining a range of elevations about the estimated elevation.

25. The method of claim 1, wherein each assumed altitude level of the at least two assumed altitude levels is associated with a different level of uncertainty.

26. The method of claim 1 wherein a size of a geographic area associated with each coverage area is based at least in part on attributes of the terrain associated with the geographic area.

* * * * *